Figure 1:
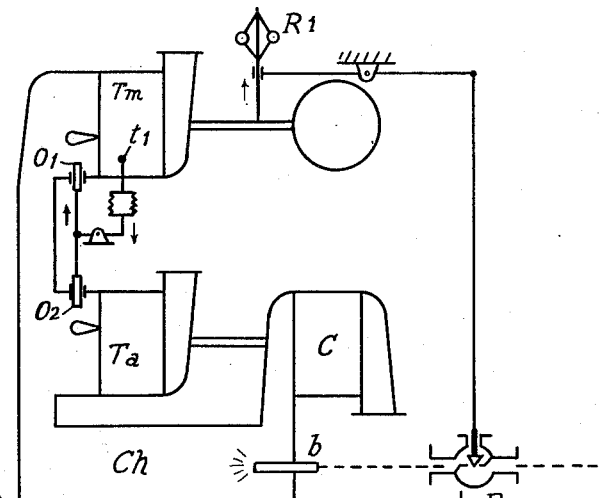

April 3, 1945.　　M. H. L. SEDILLE　　2,372,686
SYSTEM AND DEVICE FOR CONTROLLING THERMAL GAS TURBINE MOTIVE UNITS
Filed March 16, 1942　　2 Sheets-Sheet 1

Inventor
MARCEL H. L. SEDILLE
By
Attorney.

April 3, 1945.   M. H. L. SEDILLE   2,372,686
SYSTEM AND DEVICE FOR CONTROLLING THERMAL GAS TURBINE MOTIVE UNITS
Filed March 16, 1942   2 Sheets-Sheet 2
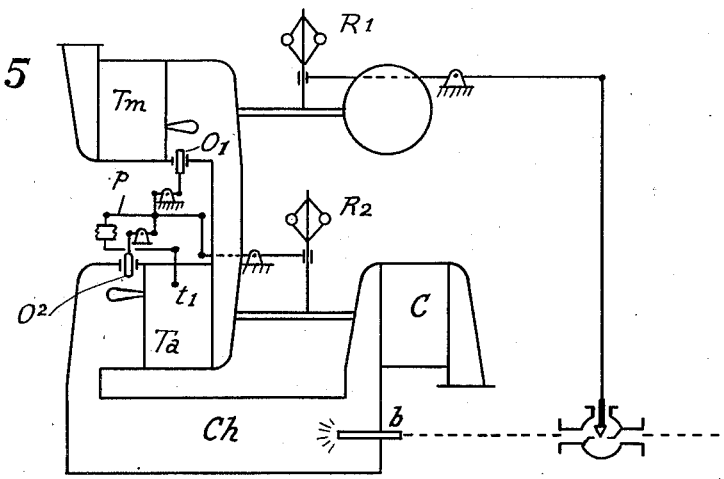
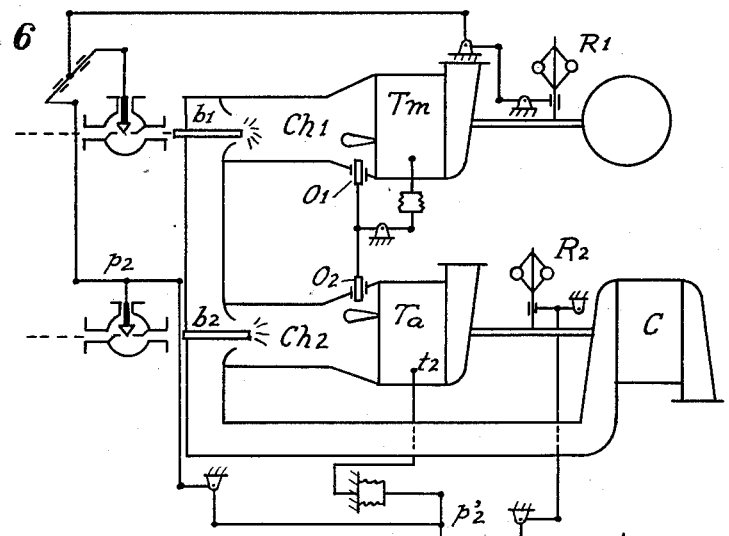
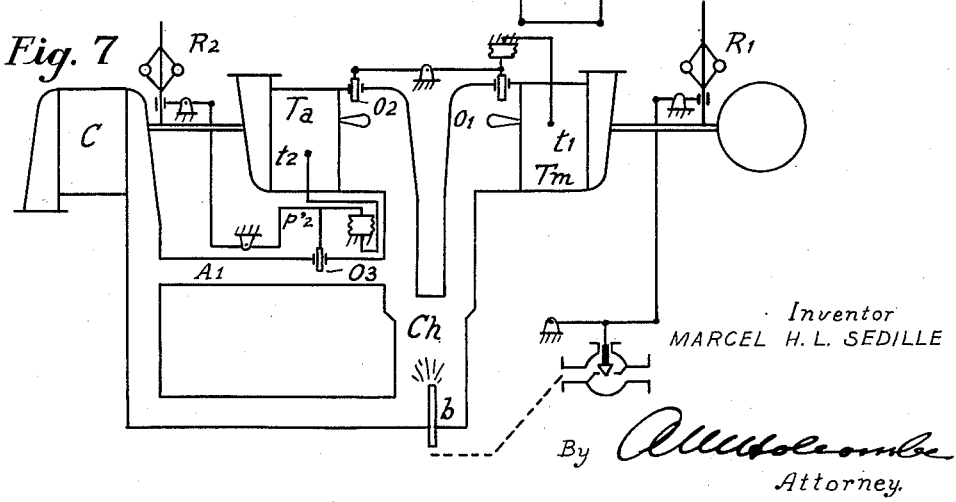
Inventor
MARCEL H. L. SEDILLE
By
Attorney.

Patented Apr. 3, 1945

2,372,686

UNITED STATES PATENT OFFICE 2,372,686

SYSTEM AND DEVICE FOR CONTROLLING THERMAL GAS TURBINE MOTIVE UNITS

Marcel Henri Louis Sedille, Paris, France; vested in the Alien Property Custodian Application March 16, 1942, Serial No. 434,985 In France March 10, 1941

2 Claims. (Cl. 60—41)

The present invention relates to gas turbine motive units the object of which is to supply power or to drive any receiving apparatus whatsoever. The motive unit may be constituted in any manner and comprise for example, one or several compressors connected in series or in parallel, with or without intermediary refrigeration, one or several combustion chambers, one or several motive or auxiliary turbines with or without intermediary reheating, with or without several heat exchangers; the driven apparatus may be an electric generator or any other apparatus having or not a constant speed.

The invention relates to motive sets having two or more shafts at least one of which is used to drive the air compressor or compressors.

In what follows, it will be supposed for the sake of simplifying the exposition, that there are only two shafts, one of which drives the receiving apparatus, the other driving the air compressor, that there is no regenerator, nor any intermediate reheater between the turbines, nor any air refrigerator, these suppositions affecting in no way the scope of the invention which can be applied also to more complex motive sets.

The object of the present invention is a system for controlling the temperature in turbines, according to which system the temperature of the gases on leaving the first row of mobile blading is maintained constant, or between two limits or inferior to a given limit, dependent or not on the speed, the said temperature being, in practice, sufficiently close to the average temperature of the mobile blades themselves and, in any case, dependent on it.

In order to act on the said temperature, while maintaining the power delivered by the set at the required value, the invention provides for an increase in the power supplied by the auxiliary turbine, so that the compressor operating at a higher speed delivers more air and the temperature of the gases falls; moreover the fuel supply is simultaneously adjusted to maintain the power delivered.

From the viewpoint of yield, it is desirable that the operating point of the compressor remain as close as possible to the maximum yield for each speed; certain devices which also constitute the object of the present invention obtain this result.

The description which follows with reference to the appended drawings given by way of non-limitative example, will indicate how the invention can be embodied, those peculiarities which appear in the drawings as well as in the text being of course a part thereof.

Figs. 1, 2, 3, 4, 5, 6 and 7 show a few non-limitative embodiments of the invention.

Fig. 1 represents a turbine motive unit in which the motive turbine $Tm$ and the auxiliary turbine $Ta$ are arranged in parallel. The unit comprises only one combustion chamber $Ch$, the load regulator of the motive turbine, which is in this case supposed to be a speed governor $R_1$ but which could be a regulator of any other kind, acts on the supply of fuel furnished to burner $b$. It being supposed that the turbine the most exposed to rises in temperature is the motive turbine $Tm$, a thermostat $t_1$ maintains at a constant value the temperature of the gases leaving the first row of mobile blading of this turbine by simultaneously acting on the obturators $O_1$ and $O_2$ which affect only a fraction of the gas current passing through each one of the turbines $Ta$ and $Tm$.

If, for example, the temperature, after the first row of mobile blading of the turbine $Tm$, has a tendency to increase, the thermostat $t_1$ opens $O_2$ on the feed end of the auxiliary turbine and shuts $O_1$ on the feed end of the motive turbine; the auxiliary turbine accelerates and the compressor furnishing a greater air supply, the temperature of the gases falls. The respective simultaneous positions of the obturators $O_1$ and $O_2$ can be calculated or determined experimentally in order to maintain the compressor C at its maximum yield for its new equilibrium speed. The load governor $R_1$ maintains the power delivered by the unit at the required value by acting on the fuel supply.

Figure 2:
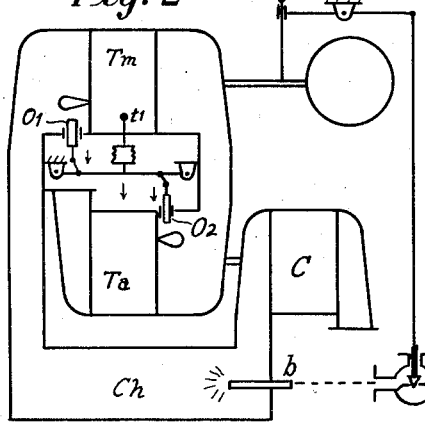

In the embodiment shown in Fig. 2, the turbines $Tm$ and $Ta$ are set in series, it being supposed that the motive turbine $Tm$ is the high pressure turbine. The governor $R_1$ acts as before on burner $b$, and the thermostat $t_1$ on the obturators $O_1$ and $O_2$ which affect only a portion of the gas current passing through each turbine. When the temperature of the gases leaving the first row of mobile blading of the turbine $Tm$ has a tendency to rise, the thermostat closes the obturator $O_2$ and opens the obturator $O_1$. The thermal drop in the turbine $Tm$ has a tendency to diminish and that in the turbine $Ta$ a tendency to increase; the compressor accelerates and thereby delivers a greater air supply and the temperature of the gases diminishes. As before, the governor $R_1$ controls the fuel consumption by maintaining the power delivered by the turbine $Tm$ at the required value. The respective simultaneous positions of the obturators $O_1$ and $O_2$ may be experimentally calculated or determined in order to maintain the compressor C at its optimum yield for its new equilibrium speed.

Figure 3:
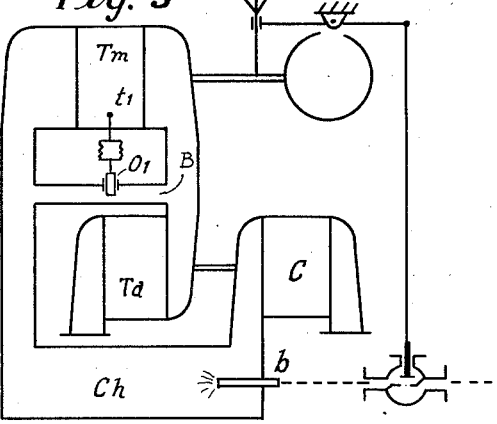

In the embodiment shown in Fig. 3 the constituent parts of the motive unit have the same layout as in the preceding figure; the control is effected by by-passing a certain quantity of gas to the turbine $Ta$, through by-pass B, a quantity which is controlled by the obturator $O_1$ in the by-pass B dependent upon the thermostat $t_1$.

Of course the same devices can be provided if the high pressure turbine is the auxiliary turbine and the low pressure turbine the motive turbine.

Figure 4:
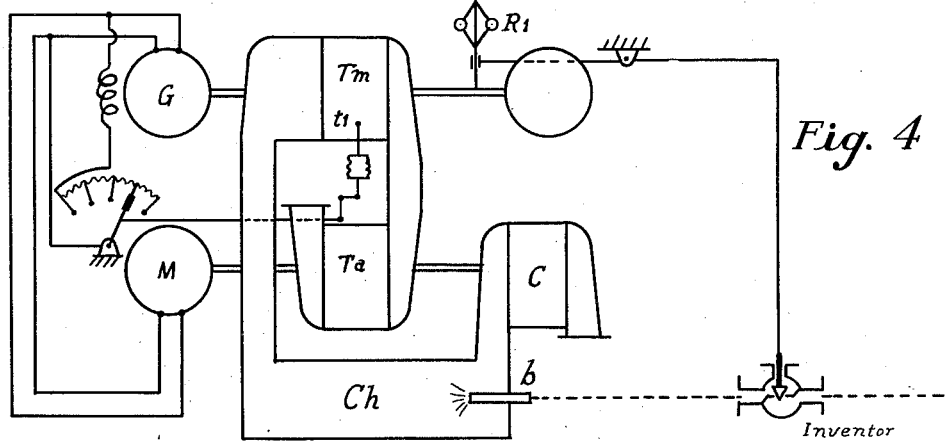

In the embodiment shown in Fig. 4 where the turbines are, by way of example, connected in series, the control is obtained by an electric generator G mounted on the shaft of the motive turbine $Tm$ and by an electric motor M mounted on the auxiliary shaft and receiving its power from the generator G by means of a regulator (device for varying the excitation of the generator G for example) controlled by the thermostat $t_1$. If the temperature reaches an inadmissible value in the turbine $Tm$, the generator G, as a result of the action of the thermostat $t_1$, supplies more power to the motor M which condition results in an increase in the air supply delivered by the compressor; simultaneously the governor $R_1$ reestablishes the power at the required value; of course this arrangement can also be used if the high pressure turbine is the auxiliary turbine and if the turbines are connected in parallel.

Fig. 5 represents an embodiment in which the turbines are connected in series; the thermostat $t_1$ in turbine $Ta$ and the speed detector $R_2$ operated by turbine $Ta$, both act on the position of the obturators $O_1$ and $O_2$ of the turbines $Tm$ and $Ta$, respectively by means of a swingle-tree $p$. In this embodiment, the control of the obturators $O_1$ and $O_2$ of the turbines $Tm$ and $Ta$, respectively, is effected by the combined operation of the thermostat $t_1$ sensitive to temperature change in the turbine $Ta$, and the governor $R_2$ sensitive to the speed of the turbine $Ta$ affected by the fuel control by governor $R_1$ variable according to the load on turbine $Tm$.

In all the above examples, the motive unit has only one combustion chamber.

In the embodiment shown in Fig. 6, two motive and auxiliary turbines are connected in parallel and each fed by a combustion chamber $Ch_1$ and $Ch_2$. The burner $b_2$ is operated by a swingle-tree $p_2$. The load governor $R_1$ of the main unit acts on the burner $b_1$ and on one of the branches of this swingle-tree $p_2$. A thermostat $t_1$ placed at the delivery end of the first mobile blading of the motive turbine $Tm$ acts on both obturators $O_1$ and $O_2$. A thermostat $t_2$ placed at the delivery end of the first mobile blading of the auxiliary turbine and combined, for example by means of a swingle-tree $p'_2$ with an organ $R_2$ sensitive to the speed of the auxiliary group, actuates the other branch of the swingle-tree $p_2$.

When the load diminishes, for example, the governor $R_1$ reduces the feed of fuel to the burners $b_1$ and $b_2$; the auxiliary group slows down and the temperature at both turbines varies.

If the said temperature has a tendency to rise beyond the limit allowable after the first expansion stage of the turbine $Tm$, the thermostat $t_1$ closes $O_1$ and opens $O_2$ thus causing the auxiliary unit to accelerate, which unit delivers more air and causes the temperature of the gases to drop; likewise, the thermostat $t_2$ and the organ $R_2$ sensitive to the speed simultaneously act on the fuel supply to the burner $b_2$ in order to maintain the temperature, after the first expansion stage of the turbine $Ta$, at a value which is a function of the speed. If this temperature rises, $t_2$ closes $b_2$ and the governor $R_1$ reestablishes the power delivered by opening $b_1$; the temperature at the turbine $Tm$ thereby increases, which condition actuates the regulation controlled by the thermostate $t_1$. When $t_2$ acts, it is possible to have it obtain only as approximate adjustment of $b_1$ and of $O_1$ and $O_2$ so that $R_1$ and $t_1$ need only then to perfect this adjustment.

Naturally, one of the temperature adjustments may exist without the other, in the case where the latter should prove unnecessary.

In the embodiment shown in Fig. 7, the two turbines connected in parallel are fed by the same combustion chamber and their operating temperatures may be rendered different by means of a conduit $A_1$ feeding supplementary fresh air into one of them, the said conduit being provided with a regulating valve or damper $O_3$.

The governor $R_1$ acts on the burner $b$, the thermostat $t_1$ of the motive turbine acts on both the obturators $O_1$ and $O_2$; the thermostat $t_2$ of the auxiliary turbine the action of which is, for example, corrected by the organ $R_2$, sensitive to speed, by means of a swingle-tree $p'_2$, controls the valve $O_3$; when the load drops, for example, the governor $R_1$ reduces the fuel feed to the burner $b$; if the temperature at the turbines then has a tendency to rise, the thermostat $t_1$ opens $O_2$ and closes $O_1$ which causes the auxiliary unit to accelerate and lowers the temperatures.

If in spite of this, the temperature at the turbine $Ta$ is still too high, the thermostat $t_2$ opens $O_3$, which lowers the temperature at the auxiliary turbine but simultaneously raises the temperature at the motive turbine; the thermostat $t_1$ then enters into action to bring it back again. This action may be limited to a small measure if $t_2$ and $R_2$ act on $O_1$ and $O_2$ in parallel with $T_1$ in order to obtain an approximate adjustment. The respective simultaneous positions of the three valves $O_1$, $O_2$ and $O_3$ may be calculated so that the compressor yield be substantially a maximum for all loads; naturally the turbine $Tm$ may also be provided with an organ sensitive to speed if its speed diminishes with the load; finally, only one of the two temperature controls can exist.

In all of the above examples, as in all similar examples falling within the scope of the invention, one and only one position of the control organs utilized corresponds to each load; the said organs are controlled by the thermostats but can be controlled by the load organ of the main unit itself, that is to say for example by its speed governor when the unit is at a constant speed, on condition that the position of the control organs which maintain the temperature considered constant can be calculated or noted experimentally; it is then possible to completely suppress the automatic control or to keep it as a safety measure by having it act only as a limiting device; the load regulator of the motive turbine can also obtain only an approximate adjustment of the regulation organs described (organs $O_1$, $O_2$, $O_3$) the thermostats then having only to perfect this adjustment.

What I claim is:

1. In a thermal gas turbine unit comprising a motive turbine for delivering power, an auxiliary turbine mechanically independent of the motive turbine, an air compressor driven by the auxiliary turbine, means to heat the air from the compressor before it is supplied to the turbines, means to supply fuel to the heating means; a governor on the motive turbine controlling the fuel supplying means, a thermostat in one of the turbines controlling the supply of heated air to the turbines, and means for controlling the operation of the auxiliary turbine said controlling means comprising a governor operated by the auxiliary turbine and means responsive to changes in the temperature of the operating air in the auxiliary turbine.

2. In a thermal gas turbine unit comprising a motive turbine for delivering power, an auxiliary turbine mechanically independent of the motive turbine, an air compressor driven by the auxiliary turbine, means to heat the air from the compressor before it is supplied to the turbines, means to supply fuel to the heating means, a governor on the motive turbine controlling the fuel supplying means, a thermostat in the motive turbine controlling the supply of heated air to the turbines, a second governor actuated by the auxiliary turbine, and a second thermostat in the auxiliary turbine, said second governor and said second thermostat cooperating to control the operation of the auxiliary turbine.

MARCEL HENRI LOUIS SEDILLE.